May 24, 1960    H. P. GREGOR    2,937,524
POLYELECTROLYTE WATER-INDICATING DEVICES
Filed Sept. 17, 1956

INVENTOR
Harry Paul Gregor
BY
Charles J. Elderkin
ATTORNEY

United States Patent Office 2,937,524
Patented May 24, 1960

2,937,524

POLYELECTROLYTE WATER-INDICATING DEVICES

Harry Paul Gregor, Hewlett, N.Y., assignor to Polytechnic Institute of Brooklyn

Filed Sept. 17, 1956, Ser. No. 610,409

22 Claims. (Cl. 73—335)

The present invention relates to novel devices for indicating the presence and quantum of water or moisture within the atmosphere or other gaseous bodies, solutions, solvents, and the like. More particularly, the invention contemplates the provision of new and improved water-indicating devices which utilize a polyelectrolyte detector element in conjunction with an electrical or mechanical indicator arrangement.

Heretofore, many devices of the general class described have been proposed within the technical and patent literature. At least some of these devices function by producing direct condensation of the water vapor by varying the temperature and/or pressure, and utilizing this condensation to actuate the indicator mechanism. Another type of indicator known heretofore makes use of hygroscopic chemicals which sorb water, the accumulation of water being indicated by means of an indicator dye present in the desiccant.

An electrical method for the indication of water has also been described and is presently in use by industry. This type of device utilizes the water-sorbing properties of a salt, usually lithium chloride, contained within a film of a natural or synthetic polymeric substance, usually polyvinylalcohol. In operation, the salt sorbs varying amounts of water at various water vapor pressures, and as more water is taken up by the system, the ionic conductivity of the system increases and the resistance of the detector-film decreases, i.e., the device exhibits a decrease in resistivity with an increase in water vapor pressure.

In a variation of the foregoing principle, a dispersion of conducting particles, usually carbon granules or grains of metallic silver, is included within the lithium chloride-polyvinylalcohol film. When the water vapor pressure is relatively low, the film shrinks due to loss of water and the conducting particles are brought into contact with one another, thereby decreasing the resistance of the film. On the other hand, at increased water vapor pressures the film swells causing the particles to be separated from one another, thereby increasing the film resistance.

These lithium chloride-film-type indicating devices are not entirely satisfactory for a number of reasons. Thus, the salts tend to diffuse and crystallize in various areas of the films when dried, thereby requiring recalibration of the system, and, in addition, the film-forming materials, per se, are water-soluble to varying degrees and tend to dissolve when droplets of water are formed on the film. Furthermore, the films are frequently unstable at elevated temperatures and the film-forming materials are often difficult to prepare in film-form with consistent or reproducible results such as are required for application of mass production techniques. Lastly, the presence of salt spray or dust particles on the surface of a film will tend to alter its resistance characteristics thereby introducing error into the system.

In contrast to the foregoing defects, the polyelectrolyte water-detector of the water-indicating devices of the present invention consists essentially of a film or fibre of an insolubilized polyelectrolyte in which the concentration of the ionic groups fixed to the polymeric chain is relatively high such that a high level of Donnan exclusion is present. As a result, the film or fibre is water insoluble. Furthermore, when a device of the invention is used under circumstances in which salts might be introduced therein, as, for example, by means of a salt spray, the Donnan potential will act to prevent all but a small part of the salt from entering the film, thereby minimizing contamination effects.

The polyelectrolyte water-indicating devices of the invention can be prepared in a number of different forms. In general, they are prepared in film-form over a conducting grid or cell for use in the electrical measurement of water vapor pressure. For example, a typical device embodying the concepts of the invention consists of a non-conducting base plate of any suitable material such as glass, ceramic or a high-polymeric material, provided on the surface thereof with exposed metallic or other form of electrical contacts. The polyelectrolyte water-detecting film is mounted over the electrical contact points such that an electrical circuit is completed by the film, whereby changes in the electrical resistivity of the film caused by water absorption can be measured directly across the points or area of electrical contact.

Alternatively, the polyelectrolyte water-indicating devices may be of the mechanical-indicating type in which the polyelectrolyte-detector is formed in fibre, strip or block form, and coupled such that a variation in length or volume due to water being sorbed by the detector actuates a mechanical indicating lever or pointer. As demonstrated hereinafter, the polyelectrolyte water-indicating devices of the invention possess further superiority over known devices of the same general class, in that, a single element can serve to indicate the entire range of water vapor pressures, i.e., from relatively low humidities to humidities approaching and equaling that of the saturation point.

As will be readily apparent, these water-indicating devices have many useful applications. They may be employed within industrial control devices, in drying or humidifying equipment, in meteorological devices such as radio-sondes or drop-sondes, in air-conditioning equipment, and for a plurality of other specific applications at least some of which are described in greater detail hereinafter. The devices are exceptionally useful in indicating the moisture content within sealed packages because their actual water-sorbing capacity is negligible, and they will, accordingly, provide an indication when the package seal or other defective point first begins to admit moisture.

A further considerable advantage of the devices of the invention resides in the fact that they may be made quite small, such, for example, with an active area equal to that of a circle of one-quarter inch (¼″) or less in diameter. Furthermore, they can be prepared in a simple and reproducible manner from readily available raw materials, thereby insuring the application of mass production techniques and overall low unit cost. The use of the polyelectrolyte detectors also affords minimum hysteresis effects since these high-polymeric materials, by nature, will not diffuse or migrate about appreciably within a film or other form in which they are employed.

The essential element of the devices of the invention, namely, the polyelectrolyte film, fibre, strip or block, as the case may be, consists essentially of a water-insolubilized polyelectrolyte which may be produced in a number of different ways from a number of different materials. No claim is made herein for the operative polyelectrolytes as such, nor the general techniques employed in their production and fabrication. Rather, the invention is concerned with the novel and useful devices obtained when the polyelectrolytes or ion-exchange resin materials are prepared and used in the manner explained hereinbefore and described in greater detail hereinafter.

The polyelectrolytes may be of the polyacid or cation-exchange type, including groups such as the sulfonic, carboxylic, phosphonic and similar types. They may also be of the polybasic or anion-exchange type such as the amino, quaternary amino, imidazole, imidazolium, pyridine or pyridinium types, or, they may be of the ampholyte type such as the amino-carboxylic resins, etc. Alternatively, the detector elements may be formed of combinations of any or all of the foregoing types of materials. The detector can also be formed of substances which possess ionogenic groups that form polyelectrolytes when properly treated prior to their application in the water-indicating devices of the invention. The polyelectrolytes may be of either the "linear" or "cross-linked" types as commonly understood within this field of technology.

The detector or active material of the devices of the invention may consist of a single piece of a polyelectrolyte or ion-exchange substance, or a single ion-exchange resin particle; it may consist of a polyelectrolyte insolubilized by inter-twining the chains thereof with those of a water-insoluble matrix polymer; or, it may consist of ion-exchange particles or granules imbedded within a matrix formed of insoluble materials. It is only required for purposes of the invention that the detector or active element be of sufficient concentration with respect to the ionic groups so as to be capable of sorbing water actively and exhibiting an increase in electrical conductivity thereby. The material must also be of a reasonable degree of chemical stability as demanded by any specific application of an indicating device employing the same.

While the use of naturally-occurring polyelectrolytes is included within the scope of my invention, in general, I prefer to employ synthetic materials. It is also recognized that many materials show polyelectrolyte or ion-exchange properties due to trace amounts or low amounts of ionic groups present therein, but to qualify as an operative substance for purposes of the present invention, the active material or detector substance should contain at least one equivalent of ionically active groups attached to the polymer per ten thousand (10,000) grams of the material in the dry state, and will usually contain this number of ionic groups per one thousand (1000) grams, or as little as fifty (50) grams of material in the dry state. The active materials are variously referred to as insolubilized polyelectrolytes, ion-exchange resins, or ion-exchange membrane materials.

It should be explained that the counter-ions or exchange ions of the polyelectrolyte can consist of a large number of ions. That is to say, in certain applications it is adisable to have the hydrogen ion as the counter-ion for a sulfonic group, whereas for others the sodium or potassium ion will be particularly useful. Since polyelectrolytes or ion-exchange resinous materials have the property of readily exchanging anions for other anions, or cations for other cations, the mobile ionic species best suited to each application should be selected.

The molecular weight of a polyelectrolyte is not in itself of primary importance, but rather, I have found that it is only required that the chain length between cross-links or points of attachment to the matrix material be preferably not greater than fifty (50) carbon atoms in length. A greater degree of stabilization of the polymer units usually leads to a lower degree of hysteresis, and is therefore highly desirable.

The changes in the electrical properties of the active material are usually measured by use of an alternating current resistance bridge to prevent polarization. Direct current measuring devices of the vacuum-tube type can be employed, however, where the currents are relatively small and are not passed across the film for prolonged periods of time. Measurements may also be made on the basis of the dielectric constant of a film, although, in general, this is not nearly as convenient or useful. As a general rule, the resistance of a film to alternating currents at frequencies usually employed in resistance bridge measurements, would be used in connection with the devices of the invention.

As adapted for use as an electrical measuring indicator in the manner explained hereinbefore, the base plate for the device could, in principle, be formed of any non-conductive material. I have found, however, that there are certain preferred base plate materials. Thus, since it would be highly advisable in many cases to have a very strong bond between the polyelectrolyte film and the base plate, base plates formed of polymers which are similar to the film-forming polymers of casting solutions are preferred in these cases. In this manner, the solvent of the casting solution can act to dissolve some of the surface layer of the base plate into the film, such as to make the sensing film or detector and the base plate a single, relatively homogeneous strip of plastic. Furthermore, it is advantageous to have the base plate and the film-forming plastic part of the detecting film formed of the same materials so that chemical attachment by means of chemical cross-linking agents, irradiation, etc., can be effected.

The methods of application of the polymer solution to the base plate are many and varied. Films can be applied by condensation or polymerization in situ, by spraying, dipping, rolling on, or by use of a knife-edge spreader, commonly referred to as a "doctor blade," as well as other well known techniques used to apply coatings or films to surfaces.

The films of the insolubilized polyelectrolyte will vary in thickness depending upon the amount of solids present in the casting solution, upon the method of casting or forming the film and upon the viscosity of the solution. Films can be cast or prepared in thicknesses varying upwards of 0.1 inch in thickness to less than 0.0001 inch. In general, I have found that films varying from 0.0002 to 0.002 inch in thickness produce admirable results, since when used with conducting grids of convenient dimensions, the resistance range was found to be that covered by conventional resistance bridges. Where rapid speed of response is desired, thinner films are employed although this results in increased resistance. Similarly, thicker films give lower ohmic resistances for the same water content, but slower speeds of response.

Many methods are also available for forming suitable conducting grids over which the polyelectrolyte water-indicating films may be cast in forming an electrically responsive indicating device. One simple means which I have found to be effective is to employ a paint or paste which contains metal particles in a highly dispersed state. Such paints or pastes can be applied to the base plate simply by painting or spraying directly thereon, or over a suitable mask, or by using a suitable silk screen. The paste, of course, must be such that the solvent does not attack the base plate, and that drying conditions will not damage the base plate. Other methods which are available include photographic processes whereby a thin film of an electrically conducting metal is deposited or formed on the base plate. The conducting grid may also be made of metal tapes or screens, or use can be made of the many techniques developed in connection with printed circuitry. In essence, the conducting part of the grid can be formed of any inert material which has a very low specific resistivity, including, for example, metals, films of carbon particles, conductive plastics, etc. No invention is claimed herein with respect to the grid, per se, but rather, attention is merely directed to the many methods available for its formation.

A typical application of the water-indicating devices of the invention involves their use in determining the water content of various solutions and/or emulsions. For example, they find application as a means for determining the water content of organic liquids where water is present at concentrations below the saturation point. Here the operation of the device would be reversible, in that its response would be indicative only of the water content and not of the volume of solution present, i.e., a decrease in the water content would be indicated by the instrument. In situations in which the water content of the solution was in excess of the saturation point and an emulsion was formed, part of the water would leave the emulsion phase and enter the water-detecting film phase, the amount of water being transferred in this fashion being dependent upon the total volume of the emulsion phase, the water concentration within the emulsion phase, and, of course, the water-sorbing capacity of the device itself. When used with emulsions, the operation of the film detectors would be non-reversible, in that, exposure to a water content lower than a preceding concentration but above the saturation concentration of water would not give an indication of lower water content by the device.

The polyelectrolyte water-indicating devices of the invention may be employed also to detect gas pressure differentials in flowing gas systems. For example, if atmospheric air is passed at a reasonably rapid rate over an object, greater air pressures will be found to be present in certain regions than in others, dependent upon the shape of the object and the direction and velocity of the air stream. Accordingly, small water-indicating devices placed in areas of different pressures would indicate partial pressures due to the water vapor present, and, thereby, the air pressure contours of the system.

It is believed that the invention may be better understood by reference to the following description of specific embodiments of the same taken in conjunction with the accompanying drawing, wherein.

Figure 1:
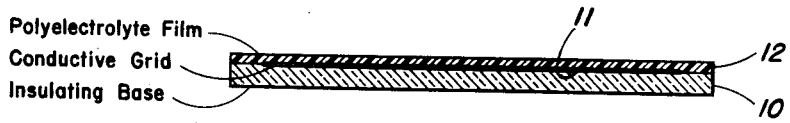
Fig. 1 is a cross-sectional edge view of a humidostat element of the invention intended for use in the electrical sensing and indication of water or moisture.

With reference to Fig. 1 of the drawing, there is shown a base plate or insulating base 10 formed of any non-conductive substance such as glass, ceramic or a high-polymeric material, and having mounted thereon a suitable conducting grid or cell 11. The polyelectrolyte water-detecting film of the invention, as indicated by reference numeral 12 in Fig. 1, is mounted over the electrical contact area of the grid or cell 11 and suitably bonded to base plate 10 such that an electrical circuit is completed by the film, whereby changes in the electrical resistance of the film caused by water absorption can be measured directly across the points or area of electrical contact.

Figure 2:
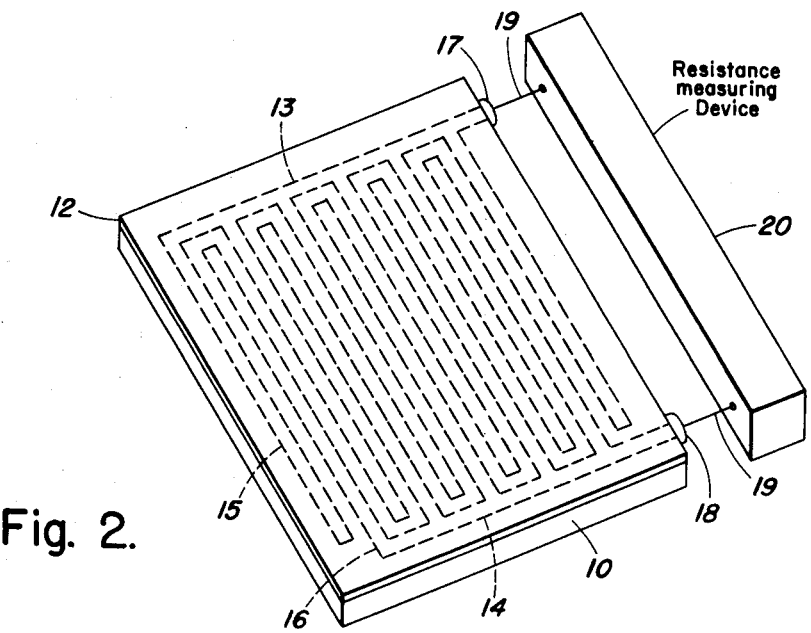
Fig. 2 is a perspective view of a humidostat of the type illustrated in Fig. 1 connected in circuit with a resistance measuring device.

Thus, as best seen by reference to Fig. 2 of the drawing, and as explained in greater detail within Example I presented hereinafter, the conductive grid pattern may be formed as a pair of electrodes 13 and 14, each having a series of interlaced conductor fingers 15 and 16, respectively, connected to separate grid bars which are in turn connected or terminated by suitable contact terminals 17 and 18, respectively. The actual formation of the grid pattern on base plate 10 may be effected by any of the techniques described hereinbefore. Lastly, the base plate and conductor grid assembly are covered by a thin film 12 of a suitable polyelectrolyte. Terminal contacts 17 and 18 are connected by lead wires 19 to any suitable resistance measuring device 20. The measuring device 20 may consist of a conventional bridge circuit or any other type of resistively responsive measuring system. For example, the lead wires 19 may be connected to opposite poles of a low voltage source of D.C., such as a battery, and a microammeter connected in series with the voltage source and electrodes 13 and 14. In this manner, as the resistance of film 12 varies with changes in the relative humidity, corresponding changes will occur in the current reading observed on the microammeter.

Figure 3:
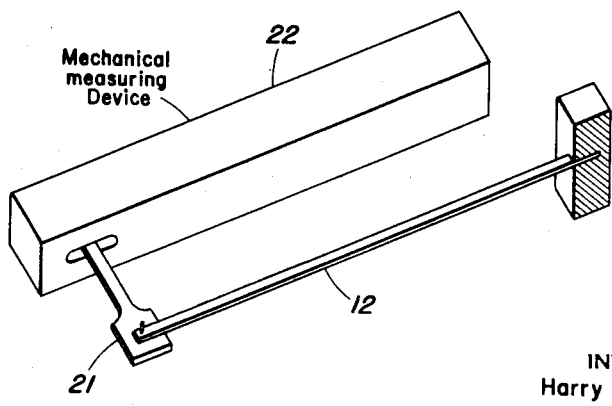
Fig. 3 is a perspective view of a typical humidostat element of the invention as adapted for use in conjunction with a mechanical type of indicating and sensing mechanism.

A simplified mechanically-responsive humidostat element is illustrated in Fig. 3 of the drawing, and consists of a unitary strip or fibre 12 of a polyelectrolyte substance of the invention which is mechanically coupled by linkage 21 to a suitable sensing mechanism 22 such that variations in the length of the strip due to water being sorbed by the detector substance will actuate a mechanical indicating lever or pointer. Of course, as pointed out hereinbefore, the detector element 12 could also be formed as a block and mechanically coupled such as to actuate an indicating mechanism on the basis of variations in the volume of the block due to water absorption.

It is believed that the invention may be best understood from a consideration of the following specific examples showing typical production and fabrication techniques employed in the production of water-indicating devices according to the principles of the invention. The examples are offered by way of illustration only, and should not be construed as limiting the scope of my invention as defined within the appended claims.

EXAMPLE I

The following technique was adopted for the production of suitable base plates for use in the fabrication of various types of polyelectrolyte water-detecting devices:

A blank, measuring one and one-half inches (1½") long by ¾ inch wide, by ⅛ inch thick, was cut from an ordinary commercial polystyrene plastic sheet. An appropriately prepared No. 25 silk screen was placed over each side of the plastic blank, and a silver paste (Hanovia Flexible Silver Coating No. 68) was brushed over the screen, thereby imparting a conductive grid pattern onto the plastic surfaces. Each grid consisted of approximately forty (40) lines, each measuring approximately ¾ of an inch long and 0.012 inch wide. One-half of the grid lines were inter-connected by a grid bar running across the lines, and the remaining grid lines were connected to another similar grid bar. Every alternate line was connected to the same grid bar, so that the final device would have a reasonably low ohmic resistance. The base plate was then heated at 80° C. for thirty (30) minutes to evaporate the paste solvent. Finally, each grid bar was connected by the silver paint to a brass screw fastened in the base plate at the ends thereof, such that one-half of the grid lines were connected to one screw and one-half to the other screw, which served as contact terminals.

EXAMPLE II

A film was prepared by dissolving two (2) parts of polystyrenesulfonic acid and one (1) part of polyvinyl-alcohol (Elvanol—Dupont) in fifteen (15) parts of water, casting the film over an appropriate base plate-mounted grid as prepared in accordance with Example I, and then drying at 40° C. for twenty-five (25) hours in dry air. The film formation, per se, was effected by repeatedly dipping the base plate into the polymer solution, followed by partial drying each time. The film was placed in an oven maintained at 100° C. for 20 minutes to effect final drying, at which point it was approximately 0.001 inch thick. The filmed-plate was then dipped into a solution containing twenty (20) parts of sulfuric acid, twenty-five (25) parts of anhydrous sodium sulfat, four (4) parts of formaldehyde, and fifty-one (51) parts of water. After fifteen (15) minutes the plate was removed, rinsed with water to remove excess reagents and salt, dried at 40° C. in dry air for forty-two (42) hours, and then finally cured for ten (10) minutes within an oven maintained at 90° C. The film was then soaked in water to remove residual traces of salt and acid, and then dried for use.

EXAMPLE III

A film was cast on an appropriate base plate from a solution consisting of one (1) part of linear (as opposed to cross-linked) polystyrenesulfonic acid prepared by the sulfonation of linear polystyrene of average molecular weight equal to 70,000, two (2) parts of a copolymer of vinylchloride and acrylonitrile ("Dynel"—Carbide and Carbon Corp.) and twenty (20) parts of dimethylformamide as solvent. The film was dried at 70° C. for eight (8) hours. The mobile hydrogen ions present in the film were exchanged for lithium ions by immersing the film in a 0.01 molar solution of lithium hydroxide for thirty (30) minutes, rinsing the film briefly with water, and redrying at 70° C. for eight (8) hours.

EXAMPLE IV

A film was cast from a solution of one (1) part of linear quaternary ammonium base, polyvinylimidazolium iodide, prepared by the treatment of polyvinylimidazole (Badasche Aniline and Soda Fabrik, Ludwigshaven, Germany) with methyl iodide, two (2) parts of "Dynel" and twenty (20) parts of dimethylformamide as solvent. The film was dried at 70° C. for eight (8) hours.

EXAMPLE V

A film was cast from a solution consisting of one (1) part of linear polystyrenesulfonic acid, one (1) part of "Dynel" and twenty (20) parts of dimethylformamide as solvent. The film was dried at 70° C. for eight (8) hours.

EXAMPLE VI

A film was cast from a solution of one (1) part of a copolymer of methylvinylether and maleic anhydride (PVM/MA, National Aniline and Film Co.), two (2) parts of "Dynel," and twenty (20) parts of the dimethylformamide. The film was dried at 70° C. for 8 hours.

EXAMPLE VII

A film was cast from a solution of one (1) part of polystyrenesulfonic acid, two (2) parts of polyvinylchloride, 0.1 part of dicumylperoxide and twenty (20) parts of dimethylformamide as solvent. The film was dried under nitrogen gas at 70° C. for five (5) hours, then heated at 120° C. for thirty (30) minutes under nitrogen. The final cured film was found to be insoluble in dimethylformamide and other solvents.

EXAMPLE VIII

A film was cast from a solution of one (1) part of the ammonium salt of polystyrenesulfonic acid (Lustrex 770, Monsanto Chem. Co.), two (2) parts of nylon 8, and seventy (70) parts of ethanol with thirty (30) parts of water as mixed solvent. After drying at 70° C. for eight (8) hours, the film was cured or cross-linked by heating at 120° C. for one-half (½) hour. It was rendered insoluble by this treatment.

EXAMPLE IX

A film was cast from one (1) part of polyvinyl imidazole, two (2) parts of Dynel and twenty (20) parts of dimethylformamide as solvent. The film was dried at 70° C. for 8 hours.

EXAMPLE X

A film was prepared by casting a polyvinylimidazole-dynel-dimethylformamide solution, as prepared in Example IX, onto a base plate, following which the film was sprayed with a solution of pentamethylene-dibromide, and heated at 60° C. for six (6) hours. Part of the polybase groups were quaternized and cross-linked by this technique.

EXAMPLE XI

A film was prepared from one (1) part of polystyrenesulfonic acid, one (1) part of polyacrylonitrile and twenty (20) parts of dimethylformamide, as described previously, cast upon a polyacrylonitrile film base and dried at 70° C. for eight (8) hours. It was then placed in a glass tube and evacuated for twenty (20) hours to remove oxygen by means of the conventional mercury diffusion pump, and, thereafter, the tube was sealed. The tube was then irradiated in a gamma ray source until a dosage of ten (10) megaroentgens had been applied. The final film was shown to have been cross-linked as evidenced by its insolubility in dimethylformamide.

EXAMPLE XII

A water-indicating device similar to that described in Example III was prepared. It was constructed by painting a conducting grid with silver paint on the outside of a glass test tube, with metal connections sealed through the glass so as to be on the inside of the tube. The polymeric water-sensing film was then cast on the outside of the tube over the conducting grid and dried at 70° C. for twenty-four (24) hours. Its hydrogen ions were replaced with sodium ions by immersing the film in a large volume of a 0.1 molar solution of sodium chloride; the film was washed with water briefly and then redried at 70° C. for twelve (12) hours.

The ability of this device for indicating the water content of an emulsion was demonstrated with an emulsion prepared by shaking together vigorously, 1 milliliter of 0.6 molar sodium chloride and 99 milliliters of a typical U.S. Navy fuel, meeting U.S. Navy specifications for "Bunker C." For the determination, ten (10) milliliters of this emulsion was diluted with forty (40) milliliters of benzene to reduce the viscosity, and the diluted suspension was poured into a glass tube into which the indicating tube was placed, and the whole shaken by hand. The ohmic resistance of the film started to decrease at once, reaching a value of 140,000 ohms in five (5) minutes, 660 ohms in twenty-four (24) minutes, and a constant resistance of 196 ohms in sixty (60) minutes. This final resistance was found to vary with the initial water content of the emulsion.

EXAMPLE XIII

A film was prepared by combining one (1) part of phenosulfonic acid, one (1) part of phenol, two (2) parts of aqueous formaldehyde solution (34%) and one (1) part of water, dissolving all of the solutes and then allowing the condensation reaction to occur at 60° C. for three hours in a closed system so as to retain the water present; followed by curing the resin at 100° C. for twenty-four (24) hours in an atmosphere having a relative humidity of fifty percent (50%). The film was then dried at 60° C. in a vacuum oven.

EXAMPLE XIV

A film was prepared from a suspension of ion-exchange resin granules in a polymeric binder. First, eight (8) parts of a cation exchange resin, prepared by the sulfonation of a copolymer of styrene and 4% (nominal) divinylbenzene (Dowex 50-X4) (having a particle size of −200 to −400 mesh and in the sodium state) and drying at 100° C. for twenty-four (24) hours, was added to a binder solution made up of four (4) parts of a copolymer of vinylchloride and vinylidene chloride (Exon 470), one (1) part of the vinyl plasticizer "Solvaloid C" and eight (8) parts of dimethylformamide as solvent. The whole was mixed thoroughly, allowed to stand for fifteen (15) minutes to allow bubbles to escape, and a film cast therefrom. The film was dried at 30° C. in a flowing stream of air at fifty percent (50%) relative humidity for twenty-four (24) hours. Films of this type are examples of the so-called heterogeneous-type films.

EXAMPLE XIV

A fiber of insolubilized polyelectrolyte was prepared from a casting solution identical with that used in Example III, except that a fibre was formed by forcing the solution through a fine orifice into water so as to produce a thread of polymer solution which was 0.030 inch in diameter. This fiber was then stretched when nearly dry to elongate it an additional fifty percent (50%) over its original length, and was dried at 70° C. for twenty-four (24) hours in the stretched state. This fiber became shorter at higher relative humidities, longer at lower relative humidities.

EXAMPLE XV

A film was prepared as set forth in Example V from equal parts of linear polystyrenesulfonic acid and "Dynel," and twenty (20) parts of dimethylformamide added as solvent, and containing additionally, one (1) part of finely-divided (−200 to −400 mesh) carbon granules. The suspension was mixed to the point of uniformity, and then cast upon a base plate, followed by drying at 70° C. for twenty-four (24) hours.

EXAMPLE XVI

The response characteristics of some of the films prepared using base plates and grids as described in Example I, and polyelectrolyte systems as described in Examples II, III, IV, and V, measured with a 1000 cycle per second alternating bridge, are indicated below:

*Table I*

RESPONSE CHARACTERISTICS OF POLYELECTROLYTE WATER-DETECTING DEVICES

[Temperature 25+0.1° C.]

| Relative humidity, percent | Ohmic resistance | | | |
|---|---|---|---|---|
| | Film of Example V | Film of Example II | Film of Example III | Film of Example IV |
| 2.93 | 6.51 | >8.0 | >7 | >7 |
| 5.30 | 6.01 | >8.0 | >7 | >7 |
| 12.30 | 4.71 | 7.50 | >7 | >7 |
| 29.06 | 3.50 | 6.28 | 6.68 | >7 |
| 56.05 | 2.35 | 4.63 | 5.25 | 6.32 |
| 74.25 | 1.98 | 3.77 | 4.59 | 6.30 |
| 91.85 | 1.48 | 3.03 | 3.78 | 6.00 |
| 96.85 | 1.20 | 2.86 | 3.33 | 4.94 |

Having thus described the subject matter of my invention, what it is desired to secure by Letters Patent is:

1. A humidity sensing device that comprises a hydrophilic humidity-detector element comprising a substantially uniform mass of a water-insolubilized polymeric electrolyte having distributed uniformly therethrough a sufficient concentration of ionically active groups such as to be capable of absorbing water readily and producing a physical change within the electrolyte in proportion to the amount of water absorbed thereby, and means coupled to said detector element for indicating the water content thereof in response to such physical change.

2. A humidity sensing device that comprises a hydrophilic humidity-detector element comprising a substantially uniform mass of a water-insolubilized polymeric electrolyte having distributed uniformly therethrough a sufficient concentration of ionically active groups such as to be capable of absorbing water readily and producing a change in the physical dimensions of said element in proportion to the amount of water absorbed thereby, and means mechanically coupled to said detector element for indicating the water content thereof in response to variations in said physical dimensions.

3. A humidity sensing device that comprises a hydrophilic humidity-detector element comprising a substantially uniform mass of a water-insolubilized polymeric electrolyte having distributed uniformly therethrough a sufficient concentration of ionically active groups such as to be capable of absorbing water readily and producing variations in the electrical resistance of said element in proportion to the amount of water absorbed thereby, and means electrically connected to said detector element for indicating the water content thereof in response to said variations in electrical resistance.

4. The humidity sensing device as claimed in claim 1, wherein said humidity-detector element consists of a block of the polyelectrolyte material, and said indicating means is responsive to changes in the volume of said block caused by variations in the water content thereof.

5. The humidity sensing device as claimed in claim 1, wherein said humidity-detector element consists of a fibre of the polyelectrolyte material, and said indicating means is responsive to changes in the length of said fibre caused by variations in the water content thereof.

6. A humidity sensing device that comprises a hydrophilic humidity-detector element consisting of a homogeneous film of a water-insolubilized cation exchange resin having distributed uniformly therethrough a sufficient concentration of ionically active groups such as to be capable of absorbing water readily and producing variations in the electrical resistance of said film in proportion to the amount of water absorbed thereby, and means electrically connected to said film for indicating the water content thereof in response to variations in the electrical conductivity of the same.

7. A humidity sensing device that comprises a hydrophilic humidity-detector element consisting of a homogeneous film of a water-insolubilized anion exchange resin having distributed uniformly therethrough a sufficient concentration of ionically active groups such as to be capable of absorbing water readily and producing variations in the electrical resistance of said film in proportion to the amount of water absorbed thereby, and means electrically connected to said film for indicating the water content thereof in response to variations in the electrical conductivity of the same.

8. A humidity sensing device that comprises a hydrophilic humidity-detector element consisting of a homogeneous film of a water-insolubilized amphoteric ion exchange resin having distributed uniformly therethrough a sufficient concentration of ionically active groups such as to be capable of absorbing water readily and producing variations in the electrical resistance of said film in proportion to the amount of water absorbed thereby, and means electrically connected to said film for indicating the water content thereof in response to variations in the electrical conductivity of the same.

9. A humidity sensing device that comprises a hydrophilic humidity-detector element consisting of a film of a water-insoluble polymeric matrix material containing particles of a water-insolubilized polyelectrolyte uniformly dispersed therethrough, said polyelectrolyte containing a sufficient concentration of ionically active groups such as to be capable of absorbing water readily and producing variations in the electrical resistance of said film in proportion to the amount of water absorbed by the particles thereof, and means electrically connected to said film for indicating the water content thereof in response to variations in the electrical conductivity of the same.

10. The humidity sensing device as claimed in claim 9, wherein said polyelectrolyte is insolubilized by cross-linking the polymeric chains thereof to said polymeric matrix material.

11. A humidity sensing device that comprises a substantially non-electrically conductive base member, a plurality of electrically conductive contact elements mounted on said base member for connection to an electrical indicating circuit, and a hydrophilic moisture sensitive film of a substantially homogeneous water-insolubilized polymeric electrolyte having distributed uniformly therethrough a sufficient concentration of ionically active groups such as to be capable of absorbing water readily and producing a change in the electrical resistance of said film in proportion to the amount of water absorbed thereby, said polymeric electrolyte film being cast over said base member to form a variable-impedance electric current path between said contact elements mounted thereon.

12. A humidity sensing device that comprises a substantially non-electrically conductive base member, a hydrophilic moisture sensitive film cast over said base member and comprising a substantially homogeneous water-insolubilized polymeric electrolyte having distributed uniformly therethrough a sufficient concentration of ionically active groups such as to be capable of absorbing water readily and producing a change in the electrical resistance of said film in proportion to the amount of water absorbed thereby, and a set of electrodes for connection to an electrical indicating circuit positioned in spaced relationship in said electrolyte film with said film forming a variable-impedance electric current path therebetween.

13. The humidity sensing device as claimed in claim 12, wherein said base member consists of a polymeric material and said moisture sensitive film is mounted on said base member by coating the polymeric electrolyte thereon while in solution within a solvent system capable of dissolving a portion of the polymeric base member, and thereafter curing said moisture sensitive film to provide a substantially homogeneous plastic body containing a surface film of said polymeric electrolyte cured to said base member and having the electrodes contained therein.

14. The humidity sensing device as claimed in claim 12, wherein said moisture sensitive film is produced by dissolving the polymeric electrolyte together with an inert film-forming polymer within a suitable solvent system, casting the film therefrom onto said base member, and evaporating at least a part of the solvent therefrom.

15. The humidity sensing device as claimed in claim 12, wherein said moisture sensitive film is produced by dissolving separate monomeric components consisting of an inert film-forming polymer and the polymeric electrolyte within a suitable solvent system, casting the resulting mixture in a thin film over said base member, and treating said monomers to polymerize the same in place on said base member to insolubilize the electrolyte within said polymeric film.

16. The humidity sensing device as claimed in claim 14, wherein said polymeric electrolyte consists of polystyrenesulfonic acid, and the inert film-forming polymer is polyvinylalcohol.

17. The humidity sensing device as claimed in claim 14, wherein said polymeric electrolyte consists of polystyrenesulfonic acid, and the inert film-forming material is a copolymer of vinylchloride and acrylonitrile.

18. The humidity sensing device as claimed in claim 14, wherein said polymeric electrolyte consists of polyvinylimidiazolium iodide, and the inert film-forming material is a copolymer of vinylchloride and acrylonitrile.

19. The humidity sensing device as claimed in claim 14, wherein said polymeric electrolyte consists of a copolymer of methylvinylether and maleic anhydride, and the inert film-forming material is a copolymer of vinylchloride and acrylonitrile.

20. The humidity sensing device as claimed in claim 14, wherein said polymeric electrolyte consists of polystyrenesulfonic acid, and the inert film-forming polymer is polyvinylchloride.

21. The humidity sensing device as claimed in claim 14, wherein said polymeric electrolyte consists of polyvinylimidazole, and the inert film-forming material is a copolymer of vinylchloride and acrylonitrile.

22. The humidity sensing device as claimed in claim 14, wherein said polymeric electrolyte is polystyrenesulfonic acid, and the inert film-forming polymer is polyamide.

References Cited in the file of this patent

UNITED STATES PATENTS

| 2,004,020 | Trogdon | June 4, 1935 |
| 2,064,651 | Fiene | Dec. 15, 1936 |
| 2,526,636 | Colman | Oct. 24, 1950 |
| 2,589,983 | Blodgett et al. | Mar. 18, 1952 |
| 2,609,688 | Larach | Sept. 9, 1952 |
| 2,636,962 | Bouyoucos | Apr. 28, 1953 |
| 2,714,149 | Craig | July 26, 1955 |
| 2,728,831 | Pope | Dec. 27, 1955 |